(12) United States Patent
Kim (10) Patent No.: US 10,242,794 B2
(45) Date of Patent: Mar. 26, 2019

(54) COMPOSITE ELECTRONIC COMPONENT

(71) Applicant: SAMSUNG ELECTRO-MECHANICS CO., LTD., Suwon-si, Gyeonggi-do (KR)

(72) Inventor: Ho Yoon Kim, Suwon-si (KR)

(73) Assignee: SAMSUNG ELECTRO-MECHANICS CO., LTD., Suwon-si, Gyoneggi-Do (KR)

(*) Notice: Subject to any disclaimer, the term of this patent is extended or adjusted under 35 U.S.C. 154(b) by 61 days.

(21) Appl. No.: 15/274,550

(22) Filed: Sep. 23, 2016

(65) Prior Publication Data

US 2017/0278626 A1     Sep. 28, 2017

(30) Foreign Application Priority Data

Mar. 22, 2016  (KR) .................. 10-2016-0033791

(51) Int. Cl.
| | |
|---|---|
| H01F 27/29 | (2006.01) |
| H01F 27/40 | (2006.01) |
| H01G 4/248 | (2006.01) |
| H01C 7/00 | (2006.01) |
| H01C 1/148 | (2006.01) |
| H01F 17/00 | (2006.01) |
| H01G 4/30 | (2006.01) |
| H01C 1/06 | (2006.01) |
| H01C 7/18 | (2006.01) |
| H01G 2/14 | (2006.01) |

(52) U.S. Cl.
CPC ............ *H01F 27/402* (2013.01); *H01C 1/06* (2013.01); *H01C 1/148* (2013.01); *H01C 7/008* (2013.01); *H01C 7/18* (2013.01); *H01F 17/0013* (2013.01); *H01F 27/29* (2013.01); *H01F 27/292* (2013.01); *H01G 2/14* (2013.01); *H01G 4/248* (2013.01); *H01G 4/30* (2013.01)

(58) Field of Classification Search
CPC ...................... H01F 5/00; H01F 27/00–27/36
USPC ............... 336/65, 83, 90–96, 200, 206–208, 336/232–234
See application file for complete search history.

(56) References Cited

U.S. PATENT DOCUMENTS

| | | | |
|---|---|---|---|
| 2010/0157505 A1* | 6/2010 | Feichtinger | H01G 4/30 361/301.4 |
| 2013/0077199 A1* | 3/2013 | Ikeda | H01T 1/22 361/56 |
| 2015/0062763 A1 | 3/2015 | Ishihara et al. | |
| 2015/0140201 A1 | 5/2015 | Adachi et al. | |

(Continued)

FOREIGN PATENT DOCUMENTS

| | | | |
|---|---|---|---|
| JP | WO 2014168141 A1 * | 10/2014 | ............ H01T 1/20 |
| KR | 10-2015-0135909 A | 12/2015 | |

*Primary Examiner* — Tuyen Nguyen
(74) *Attorney, Agent, or Firm* — Morgan Lewis & Bockius LLP (57) ABSTRACT

A composite electronic component includes a body having first and second external electrodes disposed on outer surfaces thereof and including a dielectric body; first and second electrodes disposed in the dielectric body and electrically connected to the first and second external electrodes, respectively; a third electrode disposed on the body and electrically connected to the first external electrode; an electrostatic discharge (ESD) layer disposed on the third electrode; and a fourth electrode disposed on the ESD discharge layer and electrically connected to the second external electrode.

18 Claims, 3 Drawing Sheets

(56) References Cited

U.S. PATENT DOCUMENTS

| | | | | |
|---|---|---|---|---|
| 2015/0340154 A1* | 11/2015 | Kim | ........................ | H01G 2/14 |
| | | | | 174/260 |
| 2016/0099102 A1* | 4/2016 | Matsunaga | ......... | H01F 17/0013 |
| | | | | 336/105 |
| 2017/0316879 A1* | 11/2017 | Kim | ....................... | H05K 1/181 |

\* cited by examiner

III - III'
FIG. 6

COMPOSITE ELECTRONIC COMPONENT

CROSS-REFERENCE TO RELATED APPLICATION(S)

This application claims the benefit of priority to Korean Patent Application No. 10-2016-0033791, filed on Mar. 22, 2016 in the Korean Intellectual Property Office, the entirety of which is incorporated herein by reference.

TECHNICAL FIELD

The present disclosure relates to a composite electronic component, and more particularly, to a composite electronic component having excellent resistance to electrostatic discharge (ESD).

BACKGROUND

Recently, there has been an increased tendency for portable electronic devices to be provided with cases formed of a conductive metal. Therefore, there is an increased demand for components capable of blocking electrical defects in an inner portion and an outer portion of the electronic device.

In particular, for the purpose of aesthetics, improvements of strength, and the like, manufacturing an entire surface of the portable electronic device using a metal frame has increased in popularity, and the demand for a unit that protects an internal electronic component from external electrostatic discharge (ESD) or that prevents a user from receiving an electric shock due to an internal power defect has further increased.

However, due to the miniaturization and integration of portable electronic devices, it has become difficult to provide a separate ESD protecting element or an electric shock protecting element therein.

SUMMARY

An aspect of the present disclosure provides a composite electronic component having an integrated multilayer electrostatic discharge (ESD) protection part and having excellent resistance to ESD.

According to an aspect of the present disclosure, a composite electronic component includes: a body having first and second external electrodes disposed on outer surfaces thereof and including a dielectric body; first and second electrodes disposed in the dielectric body and electrically connected to the first and second external electrodes, respectively; a third electrode disposed on the body and electrically connected to the first external electrode; an electrostatic discharge (ESD) layer disposed on the third electrode; and a fourth electrode disposed on the ESD discharge layer and electrically connected to the second external electrode.

According to another aspect of the present disclosure, a composite electronic component includes: an element part; and an ESD protection part disposed on the element part, wherein the ESD protection part includes: a first discharge electrode; an ESD discharge layer disposed on the first discharge electrode; and a second discharge electrode disposed on the ESD discharge layer.

BRIEF DESCRIPTION OF THE DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will be described in detail with reference to the accompanying drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on, " "directly connected to," or "directly coupled to" another element, there may be no other elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship relative to another element(s) as shown in the figures. It will be understood that the spatially relative terms are intended to encompass different orientations of the device in use or operation in addition to the orientation depicted in the figures.

For example, if the device in the figures is turned over, elements described as "above," or "upper" relative to other elements would then be oriented "below," or "lower" relative to the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a, " "an, " and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

An element part of a composite electronic component according to the present disclosure may be a capacitor, an inductor, or a thermistor, but is not limited thereto.

However, in the present disclosure, a case in which the element part of the composite electronic component is a capacitor will be described by way of example for the purpose of clarity of explanation.

Figure 1:
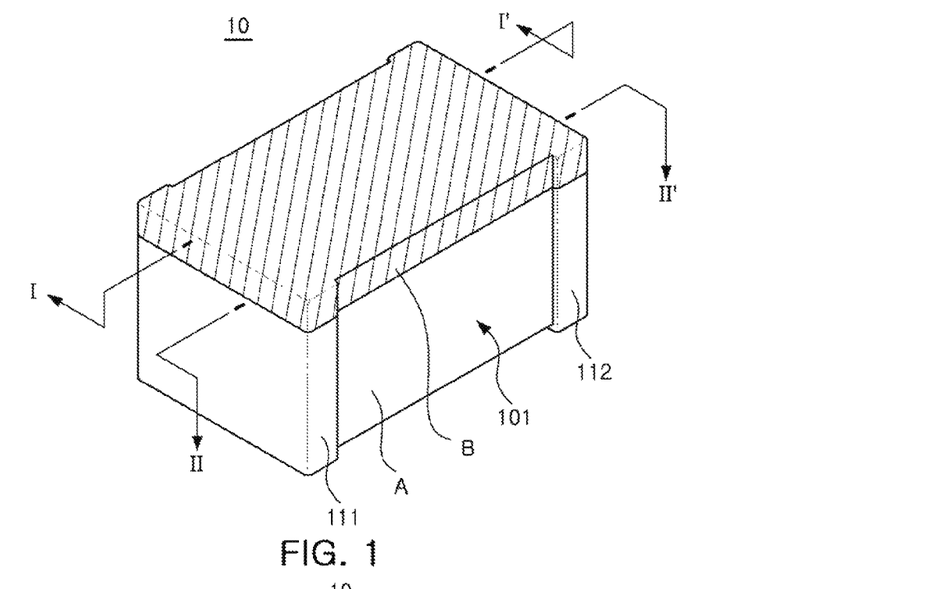
FIG. 1 is a perspective view schematically illustrating a composite electronic component according to an exemplary embodiment in the present disclosure.

FIG. 1 is a perspective view schematically illustrating a composite electronic component 10 according to an exemplary embodiment in the present disclosure.

Referring to FIG. 1, the composite electronic component according to an exemplary embodiment in the present disclosure may include a body 101 including an element part A and an electrostatic discharge (ESD) protection part B, first and second external electrodes 111 and 112 provided on outer surfaces of the body 101, and a cover layer 150 provided on the body 101.

The first and second external electrodes 111 and 112 may be provided on both ends of the body 101 in a length direction.

The first and second external electrodes 111 and 112 may include a plurality of metal layers.

For example, the first and second external electrodes 111 and 112 may include a first metal layer formed using a conductive paste containing Ag, Ni, or the like, and second and third metal layers formed by plating.

The first and second external electrodes 111 and 112 may be electrically connected to first and second electrodes 121 and 122 to be described below and may also be electrically connected to third and fourth electrodes 131 and 132, respectively.

The first and second external electrodes 111 and 112 may include main surfaces 111a and 112a disposed on both end surfaces of the body 101 in the length direction and band portions 111b and 112b that extend from first and second end surfaces of the body 101 in the length direction onto surfaces adjacent to the first and second end surfaces of the body 101 in the length direction, respectively.

The cover layer 150 may be formed using epoxy, but is not limited thereto.

The cover layer 150 may serve to protect the third and fourth electrodes 131 and 132 and an ESD discharge layer 140 of the ESD protection part B disposed on the body 101.

Figure 2:
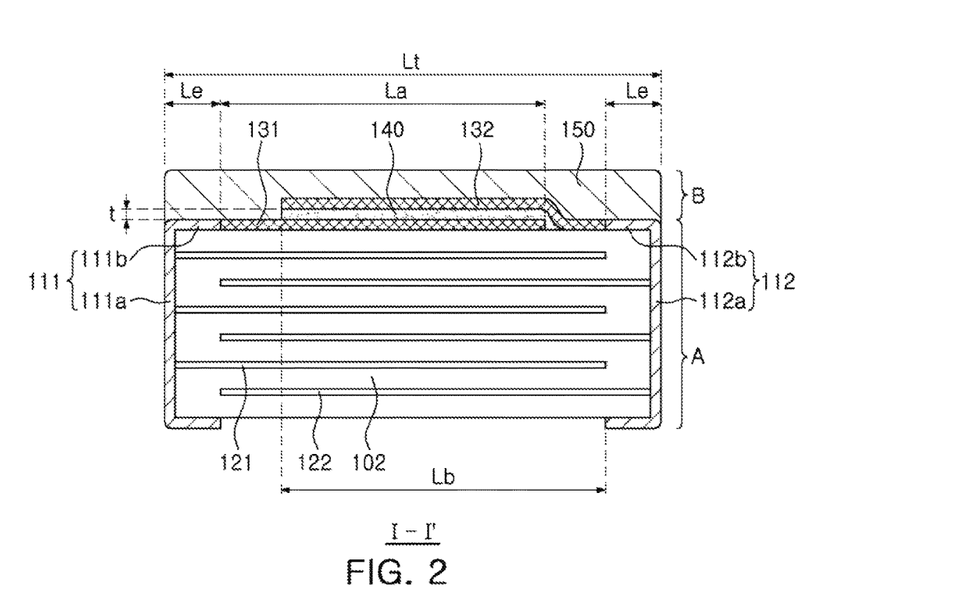
FIG. 2 is a schematic cross-sectional view taken along line I-I' of FIG. 1.

FIG. 2, a cross-sectional view taken along line I-I' of FIG. 1, is a cross-sectional view schematically illustrating the composite electronic component 10 according to an exemplary embodiment in the present disclosure.

Referring to FIG. 2, the composite electronic component 10 according to the present exemplary embodiment may include the element part A and the ESD protection part B.

The element part A may include a dielectric body 102 and first and second electrodes 121 and 122 disposed in the dielectric body 102.

The dielectric body 102 may be formed by stacking, compressing, and sintering a plurality of dielectric layers containing a ferroelectric material, and the respective dielectric layers may be integrated with each other so that boundaries therebetween are not readily apparent with the naked eye.

The dielectric layer may be formed using a material having a perovskite structure, such as $BaTiO_3$, a ferroelectric material. However, in a case in which the element part A is an inductor, the dielectric layer may be formed using a magnetic material, and in a case in which the element part A is a thermistor, the dielectric layer may be formed using a material having characteristic that a resistance is changed depending on a temperature.

A plurality of first and second electrodes 121 and 122 may be provided in the dielectric body 102.

The first and second electrodes 121 and 122 may be formed by printing a conductive paste containing a conductive material on the dielectric layers. However, in a case of the inductor, the first and second electrodes may be electrodes having a coil shape.

The conductive material used in the first and second electrodes 121 and 122 may be any one selected from the group consisting of Ni, Cu, Ag, and the like, but is not limited thereto.

The ESD protection part B may be provided on one surface of the element part A, for example, an upper surface of the element part A.

The ESD protection part B may include the ESD discharge layer 140, the cover layer 150, and the third and fourth electrodes 131 and 132.

The third electrode 131 means a first discharge electrode, and the fourth electrode 132 means a second discharge electrode.

The third and fourth electrodes 131 and 132 may be formed by printing a conductive paste containing Ni, Ag, or Cu.

After the body 101 is formed, the third electrode 131 may be printed using the conductive paste so as to be connected to only the first external electrode 111, and be dried for 15 to 30 minutes at a temperature of 100° C. to 150° C. or be hardened for 1 to 2 hours at a temperature of 180° C. to 220° C.

Then, the ESD discharge layer 140 may be printed using an ESD paste so as to cover an upper portion of the third electrode 131, and be dried for 15 to 30 minutes at a temperature of 100° C. to 150° C. or be hardened for 1 to 2 hours at a temperature of 180° C. to 220° C.

After the ESD discharge layer 140 is printed, the fourth electrode 132 may be printed using the conductive paste so as to only be connected to the second external electrode 112, and may be dried for 15 to 30 minutes at a temperature of 100° C. to 150° C. or be hardened for 1 to 2 hours at a temperature of 180° C. to 220° C.

Finally, the cover layer 150 may be formed to cover the ESD discharge layer 140 and the third and fourth electrodes 131 and 132.

However, in a case of forming the third and fourth electrodes 131 and 132 using the conductive paste, the third and fourth electrodes 131 and 132 may be damaged at a high temperature of 700° C. or more in a firing process among processes of manufacturing the composite electronic component 10. Therefore, the third and fourth electrodes 131 and 132 may also be formed using Ag-epoxy or Cu-epoxy. The Ag-epoxy or the Cu-epoxy means an epoxy resin containing corresponding conductive powders.

The third electrode 131 may be provided on the body 101, that is, on the element part A, and be connected to the first external electrode 111.

In a case in which the first external electrode 111 has the band portion 111b provided on the body 101, the third electrode 131 may be connected to the band portion 111b of the first external electrode 111.

The ESD discharge layer 140 may be provided on the third electrode 131. The ESD discharge layer 140 may be provided to cover at least portions of the end portion and the upper portion of the third electrode 131.

The fourth electrode 132 may be provided on the ESD discharge layer 140. The fourth electrode 132 may be connected to the second external electrode 112. In a case in which the second external electrode 112 has the band portion 112b provided on the body 101, the fourth electrode 132 may be connected to the band portion 112b of the second external electrode 112.

In addition, the third electrode 131 may be spaced apart from the second external electrode 112, and the fourth electrode 132 may be spaced apart from the first external electrode 111.

The third and fourth electrodes 131 and 132 may be formed to be elongated, such that an area in which the third and fourth electrodes 131 and 132 are overlapped with each other with the ESD discharge layer 140 interposed therebetween is increased, thereby improving durability of the composite electronic component 10 against an overvoltage or electrostatic discharge (ESD).

However, in a case in which the third electrode 131 is excessively close to the second external electrode 112 or contacts the second external electrode 112 or in a case in which the fourth electrode 132 is excessively close to the first external electrode 111 or contacts the first external electrode 111, an overvoltage or ESD does not flow to the ESD discharge layer 140 positioned in a portion in which the third and fourth electrodes 131 and 132 are overlapped with each other, but flows between the third electrode 131 and the second external electrode 112 or between the fourth electrode 132 and the first external electrode 111, such that the durability of the composite electronic component 10 against the overvoltage or the ESD is decreased.

Therefore, in a case in which the first and second external electrodes 111 and 112 include the band portions 111b and 112b, respectively, when lengths of the third and fourth electrodes 131 and 132 are $L_a$ and $L_b$, respectively, a length of the body is $L_t$, and a length of the band portions is $L_e$, $1.1(L_t/2-L_e) \leq L_a \leq 0.9(L_t-2L_e)$ and $1.1(L_t/2-L_e) \leq L_b \leq 0.9(L_t-2L_e)$.

In addition, a thickness t of the ESD discharge layer 140 may be within a range of 10 µm to 100 µm.

In a case in which the thickness t of the ESD discharge layer 140 is less than 10 µm, a voltage limit at which a current flows through the ESD discharge layer 140 may be excessively low, and the durability of the composite electronic component against the overvoltage or the ESD may be decreased.

In contrast, in a case in which the thickness t of the ESD discharge layer 140 exceeds 100 µm, a voltage limit at which a current flows through the ESD discharge layer 140 may be excessively high, and a discharge time of a current at the time of applying the overvoltage or the ESD may be prolonged.

Particularly, in a case in which a distance between the third electrode 131 and the second external electrode 112 or a distance between the fourth electrode 132 and the first external electrode 111 is shorter than the thickness t of the ESD discharge layer 140, an overvoltage or ESD does not flow to the ESD discharge layer 140 positioned in the portion in which the third and fourth electrodes 131 and 132 are overlapped with each other, but flows between the third electrode 131 and the second external electrode 112 or between the fourth electrode 132 and the first external electrode 111, such that resistance of the composite electronic component 10 against the overvoltage or the ESD is decreased.

Therefore, the thickness t of the ESD discharge layer 140 may be smaller than the distance between the third electrode 131 and the second external electrode 112 or the distance between the fourth electrode 132 and the first external electrode 111.

The fourth electrode 132 may extend from the second external electrode 112 and may be provided on the ESD discharge layer 140 covering the end portion of the third electrode 131.

That is, the ESD discharge layer 140 may be provided between the third electrode 131 and the fourth electrode 132.

Therefore, the third electrode 131 and the fourth electrode 132 may have regions overlapped with each other in a height direction.

In a case in which the third electrode 131 and the fourth electrode 132 are provided on the same plane so as to be spaced apart from each other, it may be difficult to make a distance between the third electrode 131 and the fourth electrode 132 constant.

However, in the composite electronic component 10 according to an exemplary embodiment in the present disclosure, an interval between the third and fourth electrodes 131 and 132 in a thickness direction may be maintained to be constant by adjusting the thickness of the ESD discharge layer 140.

Therefore, the resistance of the composite electronic component 10 according to an exemplary embodiment in the present disclosure against ESD or overvoltage may be improved, and a phenomenon in which ESD or overvoltage flows to portions of the third and fourth electrodes may be prevented to prevent the element part A or the ESD protection part B from being damaged, thereby improving the reliability of the composite electronic component 10.

The ESD discharge layer 140 may be formed using an ESD paste in which metal particles formed of at least one selected from the group consisting of Al, Cu, Ni, Ag and alloys thereof and a ceramic material formed of at least one selected from the group consisting of $SiO_2$, ZnO and a mixture thereof.

The ESD discharge layer 140 has an insulation property at a voltage limit or less. However, in a case in which a voltage higher than the voltage limit is applied, a current may flow along metal particles contained in the ESD discharge layer 140.

The voltage limit may be adjusted through a content of metal particles contained in the ESD discharge layer 140.

The ESD discharge layer 140 may be provided between the third and fourth electrodes 131 and 132, such that a current may flow between the third and fourth electrodes 131 and 132 in a case in which ESD or overvoltage of the voltage limit or more is applied, thereby preventing a phenomenon in which ESD or overvoltage is applied to the element part A to damage the element part A.

Generally, in order to improve resistance to and sensitivity against ESD or overvoltage, a width of a clearance between ESD discharge electrodes provided on the same plane may be narrow. However, the width of the clearance is narrow, such that ESD paste may not be uniformly provided in the clearance.

That is, when ESD or overvoltage is applied, a current flows to the ESD discharge electrode through the ESD discharge layer, and when the ESD discharge layer is not uniformly formed in the clearance, the current flows to a portion of the ESD discharge electrode.

Therefore, in a case in which a current having an excessive voltage only flows to a portion of the ESD discharge electrode or the ESD discharge layer, a problem in that the corresponding portion of the ESD discharge electrode or the ESD discharge layer is damaged due to overheating or electrical impact may occur. Furthermore, the element part A that the ESD protection part B contacts may be damaged due to the overheating or the electrical impact, and conductive foreign materials, or the like, may be introduced into the element part A through the damaged portion, such that reliability of the element part A may be decreased.

Even in the case that a phenomenon in which ESD or overvoltage flows to a portion of the ESD discharge electrode or the ESD discharge layer occurs once, such that the ESD discharge electrode or the ESD discharge layer may endure ESD or overvoltage, in a case in which this phenomenon is repeated several times, the ESD discharge electrode or the ESD discharge layer may be damaged.

That is, the capability of the ESD discharge electrode or the ESD discharge layer to endure ESD or overvoltage several times may be termed durability, and thus, durability to increase resistance to ESD or overvoltage may be improved.

In the composite electronic component 10 according to an exemplary embodiment in the present disclosure, since the ESD discharge layer 140 is provided between the third electrode 131 and the fourth electrode 132 in the thickness direction, the ESD discharge layer 140 may be uniformly provided between the third electrode 131 and the fourth electrode 132.

Therefore, the resistance of the composite electronic component 10 according to the present exemplary embodiment in the present disclosure against ESD or overvoltage may be improved, and a phenomenon in which ESD or overvoltage flows to portions of the of the third and fourth electrodes may be prevented to prevent the element part A or the ESD protection part B from being damaged, thereby improving reliability of the composite electronic component 10.

Figure 3:
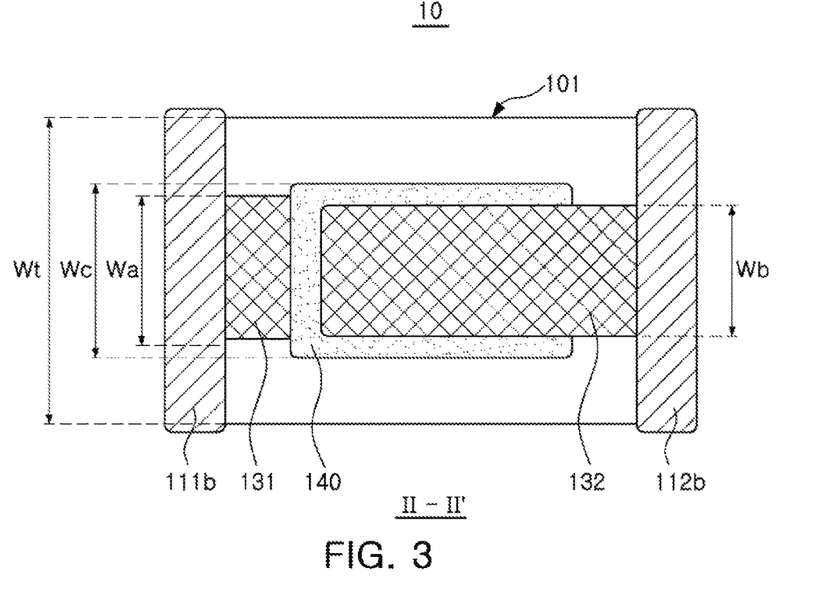
FIG. 3, a schematic plan view taken along line II-II' of FIG. 1, is a view schematically illustrating third and fourth electrodes in a state in which a cover layer is not shown.

FIG. 3, a schematic plan view taken along line II-II' of FIG. 1, is a view schematically illustrating third and fourth electrodes 131 and 132 in a state in which cover layer 150 is not shown.

Referring to FIG. 3, when widths of the third and fourth electrodes 131 and 132 are $W_a$, and $W_b$, respectively, a width of the ESD discharge layer 140 is $W_c$, and a width of the body 101 is $W_t$, $W_a < W_c < W_t$ and $W_b < W_c < W_t$.

The widths $W_a$, and $W_b$ of the third and fourth electrodes 131 and 132 or the width $W_c$ of the ESD discharge layer 140 may be increased in order to increase an area in which the third and fourth electrodes 131 and 132 are overlapped with each other. However, in a case in which the widths $W_a$, and $W_b$ of the third and fourth electrodes 131 and 132 or the width $W_c$ of the ESD discharge layer 140 are equal to or greater than the width Wt of the body 101, conductive foreign materials maybe introduced into the ESD protection part B, such that reliability of the composite electronic component 10 may be decreased.

In addition, in a case in which the widths $W_a$, and $W_b$ of the third and fourth electrodes 131 and 132 are equal to or greater than the width $W_c$ of the ESD discharge layer 140, the third and fourth electrodes 131 and 132 may be directly connected to each other due to a process deviation, such that an ESD protecting function may not be performed.

Figure 4:
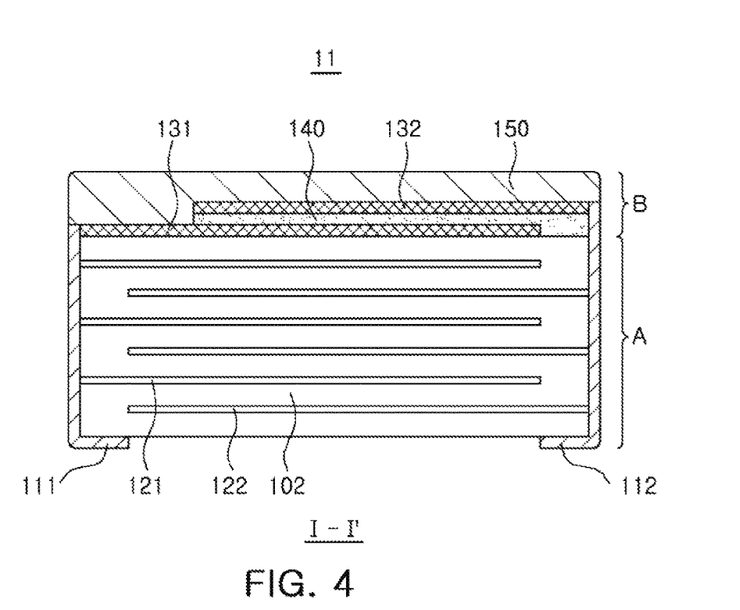
FIG. 4 is a cross-sectional view schematically illustrating a composite electronic component according to another exemplary embodiment in the present disclosure.

FIG. 4 is a cross-sectional view schematically illustrating a composite electronic component 11 according to another exemplary embodiment in the present disclosure.

In FIG. 4, a description of the same components as the components illustrated in FIGS. 1 through 3 will be omitted.

Referring to FIG. 4, in a case in which the third electrode 131 is formed on the body 101, a clearance may be generated between the third electrode 131 and the second external electrode 112.

In the composite electronic component 11 according to the present exemplary embodiment in the present disclosure, the ESD discharge layer 140 may be filled between the edge of the fourth electrode 132 and the second external electrode 112.

Therefore, a phenomenon in which the third and fourth electrodes 131 and 132 are provided on the same plane so as to be closer to each other than a thickness of the ESD discharge layer 140 may be prevented.

That is, the ESD discharge layer 140 may be filled in the overlapped region of the third electrode 131 and the fourth electrode 132, and may be provided to cover at least a portion on the third electrode 131.

For example, the ESD discharge layer 140 may also be provided on the entire lower surface of the fourth electrode 132.

In addition, in the composite electronic component 11 according to the present exemplary embodiment in the present disclosure, the first and second external electrodes 111 and 112 do not include band portions, such that an area in which the third and fourth electrodes 131 and 132 are overlapped with each other may be significantly increased.

Figure 5:
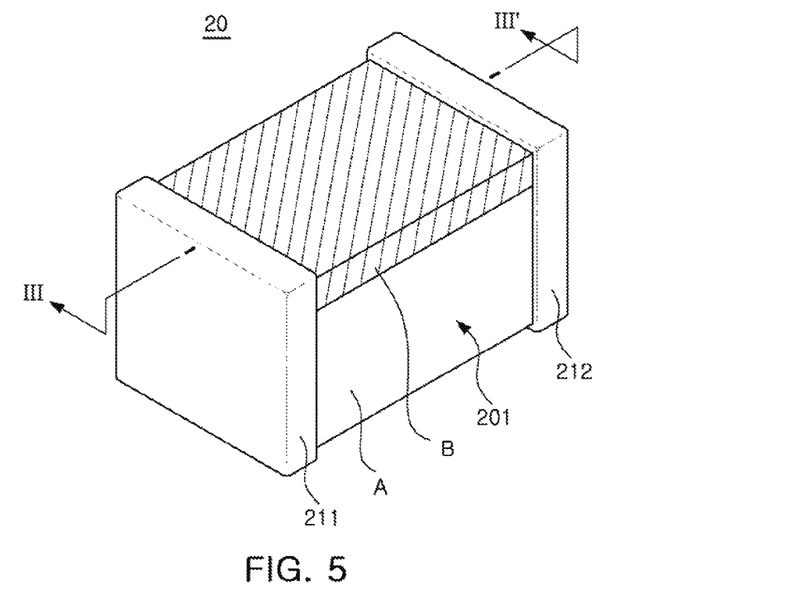
FIG. 5 is a perspective view schematically illustrating a composite electronic component according to another exemplary embodiment in the present disclosure.
Figure 6:
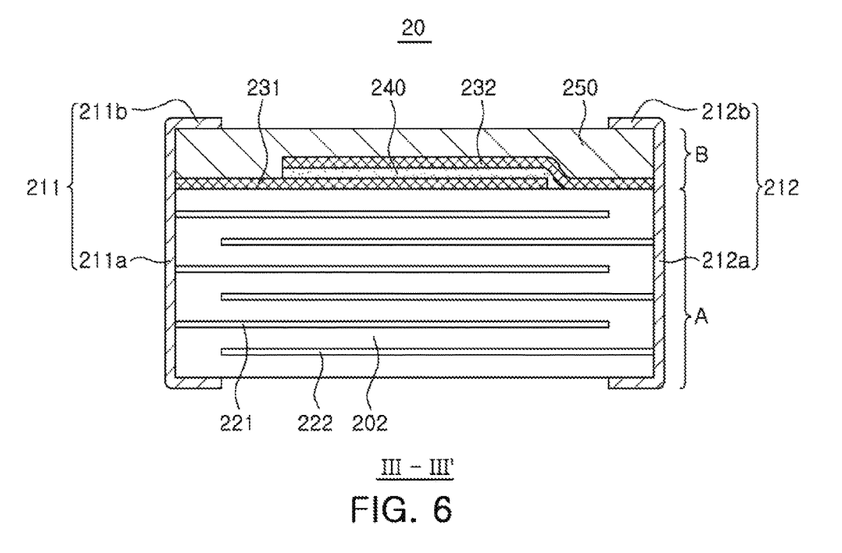
FIG. 6 is a schematic cross-sectional view taken along line III-III' of FIG. 5.

FIG. 5 is a perspective view schematically illustrating a composite electronic component 20 according to another exemplary embodiment in the present disclosure; and FIG. 6 is a schematic cross-sectional view taken along line III-III' of FIG. 5.

Referring to FIG. 5, first and second external electrodes 211 and 212 may extend from end surfaces of the body 201 in the length direction to end surfaces of the cover layer 250 in the length direction.

That is, the first and second external electrodes 211 and 212 may each include band portions 211b and 212b that extend from both end surfaces of an element part A and an ESD protection part B in the length direction onto surfaces adjacent to both end surfaces of the element part A and the ESD protection part B in the length direction.

In the composite electronic component 20 according to the present exemplary embodiment in the present disclosure, band portions are not provided between the element part A and the ESD protection part B, such that an area in which third and fourth electrodes 231 and 232 are overlapped with each other may be significantly increased.

As set forth above, the composite electronic component according to exemplary embodiments in the present disclosure may have an integrated multilayer ESD protection part in which an ESD discharge layer is provided between first and second discharge electrodes, whereby durability of the ESD protection part against ESD may be improved.

In addition, since the first and second discharge electrodes are overlapped with each other in the height direction with the ESD discharge layer interposed therebetween, a phenomenon in which a current is concentrated in a case in which the ESD is generated may be prevented, whereby the durability of the ESD protection part against the ESD may be further improved.

While exemplary embodiments have been shown and described above, it will be apparent to those skilled in the art that modifications and variations could be made without departing from the scope of the present invention as defined by the appended claims.

What is claimed is:

1. A composite electronic component comprising:
a body having first and second external electrodes provided on outer surfaces thereof and including a dielectric body;
first and second electrodes provided in the dielectric body and electrically connected to the first and second external electrodes, respectively;
a third electrode disposed on the body and electrically connected to the first external electrode;
an electrostatic discharge (ESD) layer disposed on the third electrode; and
a fourth electrode disposed on the ESD discharge layer and electrically connected to the second external electrode,
wherein a portion of the third electrode overlaps a portion of the electrode in a stacking direction.

2. The composite electronic component of claim 1, wherein the ESD discharge layer is disposed above an upper portion of the third electrode.

3. The composite electronic component of claim 1, wherein the first and second external electrodes each include band portions that respectively extend from first and second end surfaces of the body in a length direction onto surfaces adjacent to the first and second end surfaces of the body in the length direction, and
$1.1(L_t/2-L_e) \leq L_a \leq 0.9(L_t-2L_e)$ and $1.1(L_t/2-L_e) \leq L_b \leq 0.9(L_t-2L_e)$, where $L_a$ and $L_b$ are lengths of the third and fourth electrodes, respectively, $L_t$ is a length of the body, and $L_e$ is a length of the band portions.

4. The composite electronic component of claim 1, wherein $W_a < W_c < W_t$ and $W_b < W_c < W_t$, where $W_a$ and $W_b$ are widths of the third and fourth electrodes, respectively, $W_c$ is a width of the ESD discharge layer, and $W_t$ is a width of the body.

5. The composite electronic component of claim 1, wherein a thickness of the ESD discharge layer is within a range of 10 μm to 100 μm.

6. The composite electronic component of claim 1, further comprising a cover layer disposed to cover the third electrode, the fourth electrode, and the ESD discharge layer.

7. The composite electronic component of claim 1, wherein the ESD discharge layer contains metal particles formed of any one selected from the group consisting of Al, Cu, Ag, Ni and alloys thereof and ceramic particles formed of any one selected from the group consisting of $SiO_2$, ZnO and a mixture thereof.

8. The composite electronic component of claim 1, wherein the ESD discharge layer is provided on the entire lower surface of the fourth electrode.

9. The composite electronic component of claim 1, wherein the first and second external electrodes extend from end surfaces of the body in the length direction to end surfaces of the cover layer in the length direction.

10. A composite electronic component comprising:
an element part; and
an ESD protection part disposed on the element part, wherein the ESD protection part includes:
a first discharge electrode;
an ESD discharge layer disposed on the first discharge electrode; and
a second discharge electrode disposed on the ESD discharge layer,
wherein a portion of the first discharge electrode and a portion of the second discharge electrode overlap in a stacking direction.

11. The composite electronic component of claim 10, wherein the element part is a capacitor, an inductor, or a thermistor.

12. The composite electronic component of claim 10, further comprising first and second external electrodes disposed on first and second end surfaces of the element part and the ESD protection part in a length direction,
wherein the first and second external electrodes each include band portions that respectively extend from the first and second end surfaces of the element part and the ESD protection part in the length direction onto surfaces adjacent to the first and second end surfaces of the element part and the ESD protection part in the length direction.

13. The composite electronic component of claim 1, wherein the fourth electrode is bent at a portion where the fourth electrode contacts the ESD discharge layer.

14. The composite electronic component of claim 1, wherein the entirety of the third electrode is unbent and substantially parallel to an upper surface of the dielectric body.

15. The composite electronic component of claim 10, wherein the fourth electrode is bent at a portion where the fourth electrode contacts the ESD discharge layer.

16. The composite electronic component of claim 10, wherein the entirety of the third electrode is unbent and substantially parallel to an upper surface of the dielectric body.

17. A composite electronic component comprising:
first and second electrodes disposed on parallel planes in a dielectric body;
first and second external electrodes respectively connected to the first and second electrodes, and at least a portion of each of the first and second external electrodes extending in a direction perpendicular to the planes on which the first and second electrodes are disposed;
a third electrode disposed on the dielectric body and electrically connected to the first external electrode;
a fourth electrode disposed on the third electrode and electrically connected to the second external electrode at least a portion of the fourth electrode overlapping at least a portion of the third electrode in the direction perpendicular to the planes on which the first and second electrodes are disposed; and
an electrostatic discharge (ESD) layer disposed between the overlapping portions of the third and fourth electrodes.

18. The composite electronic component of claim 17, wherein the fourth electrode is bent around the ESD layer to form the overlapping portion of the fourth electrode.

* * * * *